United States Patent
Kato

(10) Patent No.: US 7,526,190 B2
(45) Date of Patent: Apr. 28, 2009

(54) AUTOMATIC FOCUSING APPARATUS AND OPTICAL INSTRUMENT INCLUDING AUTOMATIC FOCUSING APPARATUS

(75) Inventor: Takashi Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 11/530,545

(22) Filed: Sep. 11, 2006

(65) Prior Publication Data

US 2007/0058960 A1 Mar. 15, 2007

(30) Foreign Application Priority Data

Sep. 13, 2005 (JP) .............................. 2005-266059

(51) Int. Cl.
  *G03B 17/00* (2006.01)
  *G03B 13/34* (2006.01)
(52) U.S. Cl. .............................. 396/73; 396/71; 396/80; 396/123; 359/672
(58) Field of Classification Search ............ 396/71–76, 396/79, 80–82, 103, 121, 123–124; 359/354, 359/421, 672, 696–698; 348/347
See application file for complete search history.

(56) References Cited

U.S. PATENT DOCUMENTS

| 4,544,250 | A | * | 10/1985 | Tanaka et al. ................. 396/73 |
| 4,935,763 | A | * | 6/1990 | Itoh et al. ..................... 396/81 |
| 5,274,223 | A | * | 12/1993 | Hata ........................ 250/201.2 |
| 5,457,512 | A | | 10/1995 | Kondo |
| 5,758,206 | A | * | 5/1998 | Imaoka ........................ 396/80 |
| 5,793,482 | A | | 8/1998 | Tseng et al. |
| 5,852,516 | A | * | 12/1998 | Chipper ...................... 359/676 |
| 6,112,029 | A | * | 8/2000 | Suda ........................... 396/92 |
| 6,314,240 | B1 | * | 11/2001 | Okawara ...................... 396/81 |
| 6,356,307 | B2 | * | 3/2002 | Ohkawara et al. ........... 348/360 |
| 6,501,909 | B1 | * | 12/2002 | Nishimura et al. ............ 396/74 |
| 2002/0018140 | A1 | * | 2/2002 | Suemoto et al. ............. 348/358 |
| 2004/0057711 | A1 | * | 3/2004 | Ogg et al. ..................... 396/81 |

FOREIGN PATENT DOCUMENTS

| JP | 02-013073 | 1/1990 |
| JP | 02-101411 | 4/1990 |
| JP | 5-64056 | 3/1993 |
| JP | 05-145819 | 6/1993 |
| JP | 2001-051183 | 2/2001 |

OTHER PUBLICATIONS

Extended European Search Report dated Jan. 3, 2007 for European patent application No. 06120474.9.

* cited by examiner

*Primary Examiner*—W. B. Perkey
*Assistant Examiner*—Bret Adams
(74) *Attorney, Agent, or Firm*—Locke Lord & Bissell, Liddell, LLP

(57) ABSTRACT

An optical instrument including an AF circuit 12 for obtaining focus detection information, focus position detecting means 14 for detecting a position of a focus lens, an extender optical system 9, position detecting means 16 for detecting a position of the extender optical system 9, and a lens control portion 13 for generating a focus driving signal from the focus detection information, the focus lens position information and the position information, wherein driving of the focus lens is controlled by the focus driving signal via a focus motor 20.

7 Claims, 10 Drawing Sheets

AUTOMATIC FOCUSING APPARATUS AND OPTICAL INSTRUMENT INCLUDING AUTOMATIC FOCUSING APPARATUS

BACKGROUND OF THE INVENTION

1. Field of the Invention

The present invention relates to an automatic focusing apparatus including a detachably attachable focal length conversion optical system and a focusing method thereof, and in particular, to a method of controlling the automatic focusing apparatus when the focal length conversion optical system is switched.

2. Description of the Related Art

In recent years, a so-called contrast AF method is in the mainstream as to auto-focus (AF) control of a video camera. The contrast AF method detects a sharpness level of an image out of video signals obtained by photoelectrically converting a subject image with an image pickup device and renders it as an AF evaluated value so as to exert control to detect a focus lens position where the AF evaluated value is maximal.

The AF evaluated value generally used is a high-frequency component extracted from the video signal by a band pass filter of a certain band. The AF evaluated value increases as getting closer to a focusing position in the case of shooting an ordinary subject image. And a point at which the level becomes maximal is the focusing position.

There is a TTL phase difference detection method as another AF method.

The TTL phase difference detection method divides a luminous flux from the subject having passed through an exit pupil of an image taking lens into two so as to subject a pair of line sensors to the luminous flux divided in two respectively.

And an out-of-focus amount, that is, a defocus amount of the image taking lens is acquired by detecting a displacement amount of two subject image signals outputted according to a received light amount thereof, that is, a relative positional displacement amount in a direction of division of the luminous flux.

Therefore, once an accumulating operation is performed by a focus detecting sensor, it is possible to obtain the amount and direction for driving the focus lens so as to allow a high-speed focusing operation.

As for other AF methods, there are the methods of measuring the distance to the subject from an ultrasonic propagation velocity by using an ultrasonic sensor, performing triangular surveying by using an infrared sensor and the like. Furthermore, there is also a hybrid AF method combining these AF methods. In the case of the hybrid AF method, the focus lens is driven close to a focused focal point by an internal phase difference detection method and is then further driven to the focusing position accurately by the contrast AF method as in Japanese Patent Application Laid-Open No. H05-64056.

There is switching means used in a TV camera field, whereby a focal length range of the entire system is changed by detaching and attaching a focal length conversion optical system called an extender optical system from and to a part of an optical path of the image taking lens.

In the case of performing an AF with an image taking apparatus by using the contrast AF method, however, an imaging optical path is intercepted in the middle of switching the extender optical system. At this time, an abnormal change occurs to the video signal, and the AF malfunctions according to the abnormal change of the video signal.

Therefore, after completing the switching of the extender optical system, a wasteful AF operation is generated before focusing on the subject based on a correct subject image again. In the meantime, the image immediately after completing the switching of the extender optical system is in an out-of-focus state.

As for a system having a branching optical system placed therein such as the phase difference method, there are the cases where only a magnification ratio of an image provided by image pickup means is changed by switching the extender optical system without changing the magnification ratio of an image provided by focus detecting means. And there is the following problem in this case.

FIG. 10 shows focus detection areas, a subject and an image pickup screen on switching the extender optical system. Reference characters E1 and E2 denote imaging ranges when the extender optical system is 1 time and 2 times respectively, P1 and P2 denote the subjects, and F1 and F2 denote the focus detection areas.

For instance, if the extender optical system is switched from 1 time to 2 times in the case where the focus detection area is set at F2, the focus detection area F2 gets out of the imaging range so that a subject out of the imaging range is focused on. Therefore, the subject in the imaging range is put in the out-of-focus state.

SUMMARY OF THE INVENTION

An object of the present invention is to solve the above-mentioned problems and provide an image pickup system with an auto-focus function for realizing an adequate auto-focus according to shooting conditions on switching of the extender optical system.

To attain the object, an image pickup system with an auto-focus function according to the present invention is the one comprising: focus detecting means for an auto-focus; first position detecting means for detecting a position of a focus lens; a switchable focal length conversion optical system; second position detecting means for detecting a position of the focal length conversion optical system; lens control means for generating a focus driving signal according to focus detection information obtained by the focus detecting means, focus position information obtained by the first position detecting means and position information obtained by the second position detecting means; and focus driving means for driving the focus lens with the focus driving signal generated by the lens control means.

The image pickup system with an auto-focus function according to the present invention can prevent a malfunction of the auto-focus and an increase in time required for focusing which affect shooting on switching of the extender optical system.

The above and other objects, features, and advantages of the invention will become more apparent from the following detailed description taken in conjunction with the accompany drawings.

Further features of the present invention will become apparent from the following description of exemplary embodiments with reference to the attached drawings.

DESCRIPTION OF THE EMBODIMENTS

The present invention will be described in detail based on embodiments shown in FIGS. 1 to 9.

First Embodiment

Figure 1:
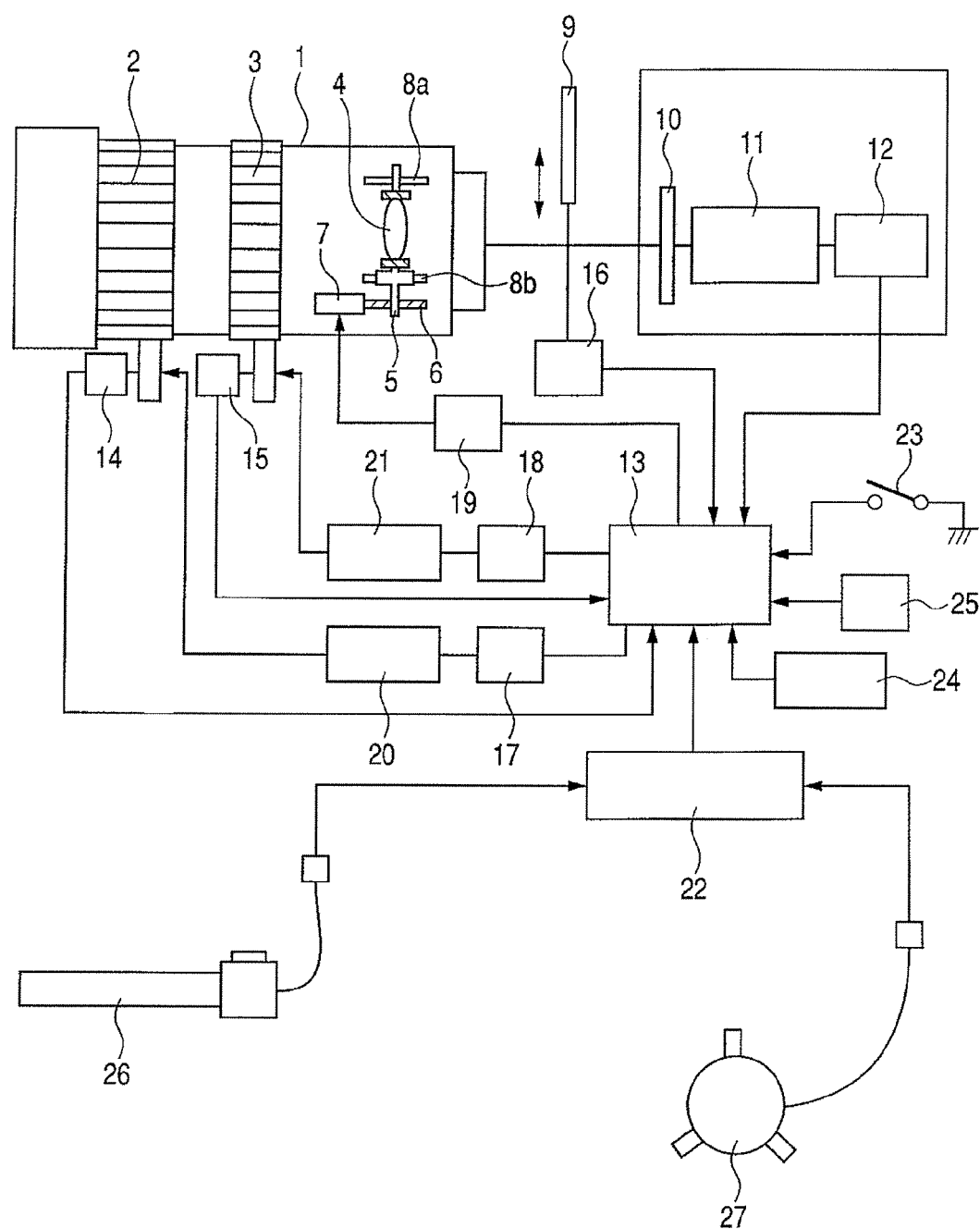
FIG. 1 is a block circuit configuration diagram of a first embodiment.

FIG. 1 is a block circuit configuration diagram of an image pickup system of a first embodiment. A zoom lens 1 adopts a front lens focus method, and has a focus lens component, a zoom lens component and an iris adjusting portion built-in. The zoom lens 1 is provided, in its front part, with a focus ring 2 for driving a focus adjusting lens and a zoom ring 3 for driving the zoom lens. The zoom lens 1 is provided with a wobbling lens component 4 in its rear part. The wobbling lens component 4 is driven by a wobbling motor 7 via a moving frame 5 and a screw mechanism 6, and is guided in an optical axis direction along guide bars 8a and 8b.

Figure 2:
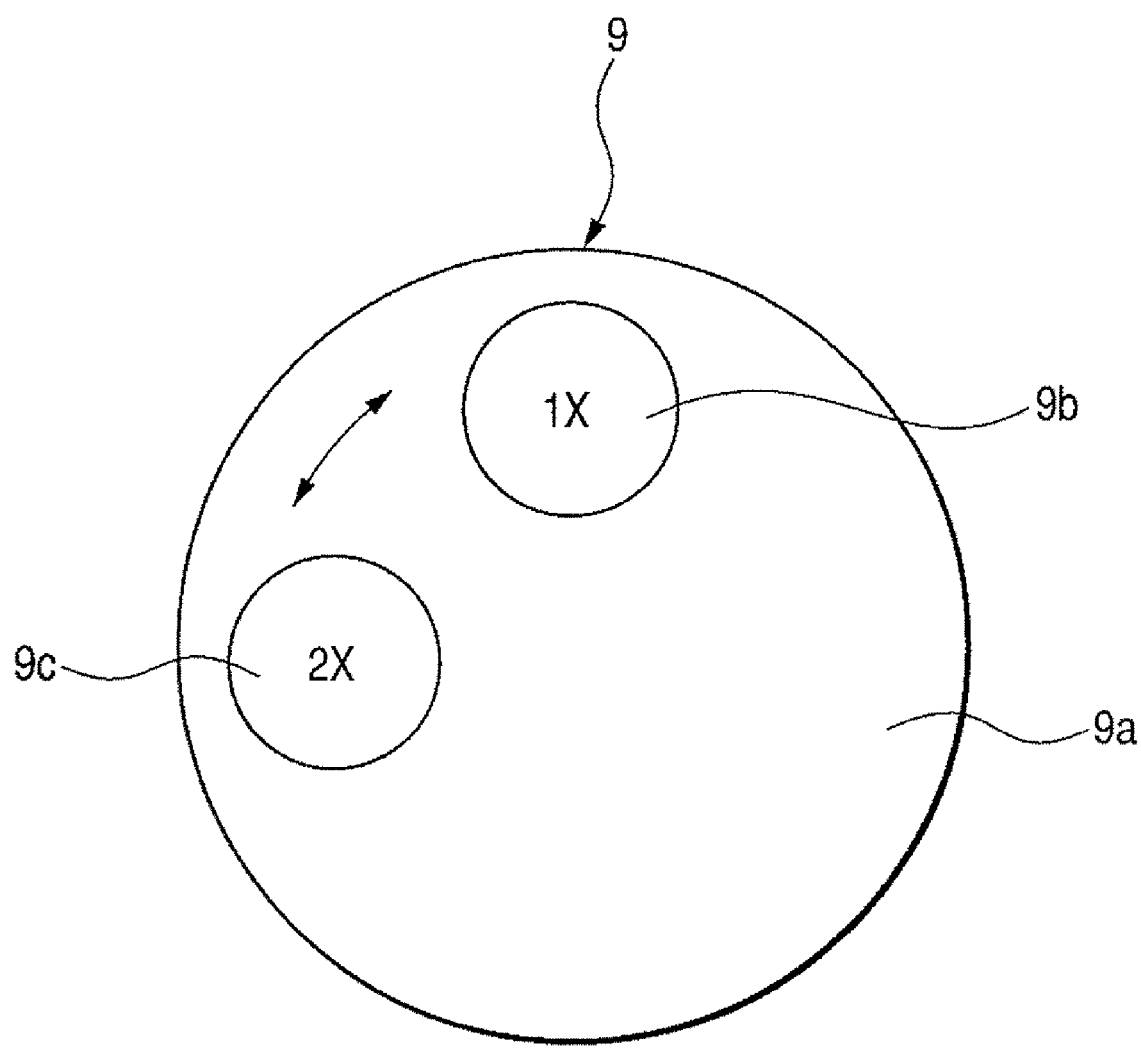
FIG. 2 is a block diagram of a turret.

An extender optical system 9 configured by a discoidal turret 9a as shown in FIG. 2 is placed behind the zoom lens 1. The turret 9a includes an extender optical system 9b of a magnification of one time and an extender optical system 9c of a magnification of two times, where a magnification ratio of the extender optical system 9 is rendered switchable by rotation of the turret 9a.

Furthermore, a CCD 10 which is an image pickup device is placed behind the extender optical system 9. An output of the CCD 10 is connected to an image processing circuit 11 and an AF circuit 12, and the output of the AF circuit 12 is connected to a lens control portion 13. The lens control portion 13 is further connected with the outputs of focus position detecting means 14 for detecting a position of the focus ring 2, zoom position detecting means 15 for detecting the position of the zoom ring 3 and extender optical system position detecting means 16 for detecting the position of the extender optical system 9.

The outputs of the lens control portion 13 are connected to a focus motor driver 17, a zoom driver 18 and a wobbling motor driver 19 respectively. It drives the focus ring 2 via a focus motor 20, rotates the zoom ring 3 via a zoom motor 21, and drives the moving frame 5 via the wobbling motor 7. Furthermore, the lens control portion 13 is connected with a zoom focus operating circuit 22, an AF switch 23, a nonvolatile memory 24 and a focus detection area changing switch 25. The zoom focus operating circuit 22 is connected with the outputs of zoom operating means 26 and focus operating means 27.

The focus ring 2 is rotated in conjunction with the front lens focus lens component to allow focus adjustment by moving the focus lens component. The focus position detecting means 14 detects the position of the focus lens component and conveys it to the lens control portion 13.

The zoom ring 3 is capable of variable power by moving the zoom lens component along a cam groove worked on a fixed lens barrel according to rotation. The zoom position detecting means 15 is coupled to a gear engaged with the zoom ring 3 so as to detect the position of the zoom lens. The zoom motor 21 rotates the zoom ring 3 via the gear and drives the zoom lens component.

The wobbling motor driver 19 drives the wobbling motor 7 according to a command of the lens control portion 13, and moves the moving frame 5 by rotation of an output axis in the optical axis direction via the screw mechanism 6 so that the wobbling lens component 4 moves.

The lens control portion 13 outputs a driving signal according to operation amounts of the zoom operating means 26 and focus operating means 27 by way of the zoom focus operating circuit 22. The zoom motor 21 and the focus motor 20 drive and operate the zoom ring 3 and the focus ring 2 with the driving signal respectively.

When shooting a subject, light having passed through the zoom lens 1 is focused on an image pickup surface of the CCD 10, and is converted to video signals and outputted by the CCD 10. The image processing circuit 11 processes the video signals inputted to the CCD 10 with a filter or the like, and outputs them to the AF circuit 12. A horizontal synchronizing signal and a vertical synchronizing signal are detected from the video signals, and a reference signal is created. The AF circuit 12 calculates a sharpness level from the reference signal as an AF evaluated value in the focus detection area set up at a center or the like of a shooting screen. Whether focusing or non-focusing is thereby determined, and determination results thereof are sent to the lens control portion 13.

Figure 10:
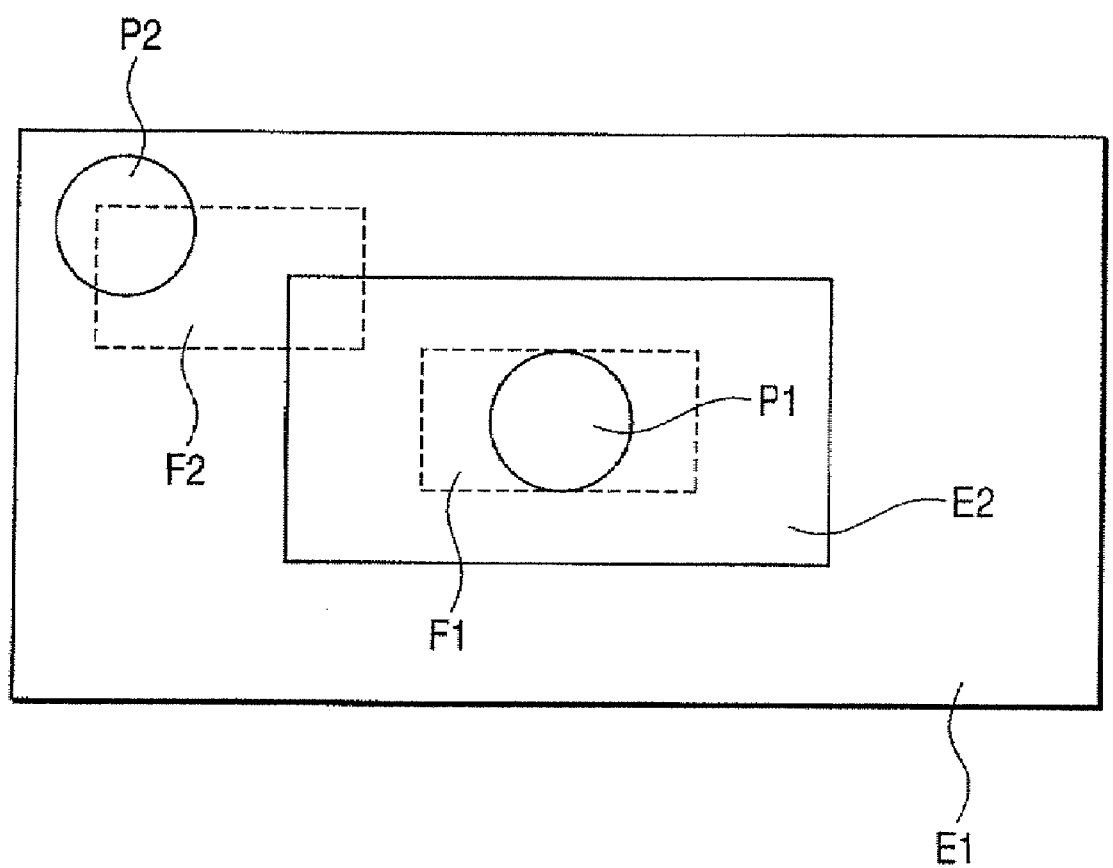
FIG. 10 is an explanatory diagram of a change of a focus detection area.

If the focus detection area is set up at a center F1 of the shooting screen in FIG. 10, a subject P1 at the center of an imaging range is constantly focused on. The position and size of the focus detection area are arbitrarily changeable by a user with the focus detection area changing switch 25.

The lens control portion 13 outputs a wobbling lens driving signal, and slightly moves the wobbling lens component 4 back and forth with the wobbling motor 7 in the optical axis direction. The direction in which the sharpness level increases is detected to seek a focusing direction. The lens control portion 13 calculates a target position of the focus lens component for maximizing the sharpness level based on the sharpness level calculated by the AF circuit 12 and the current position and focusing direction of the focus lens component according to the focus position detecting means 14.

A focus control signal is outputted to the focus motor driver 17, and the focus motor driver 17 rotates the focus motor 20. And the subject is focused on by driving the focus lens component.

A magnification ratio of the extender optical system, that is, a rotation position of the turret 9a is detected by the extender optical system position detecting means 16, and is inputted to the lens control portion 13. For instance, a relation between the magnification ratio of the extender optical system and position data obtained by the extender optical system position detecting means 16 are stored in the nonvolatile memory 24 in advance.

Figure 3:
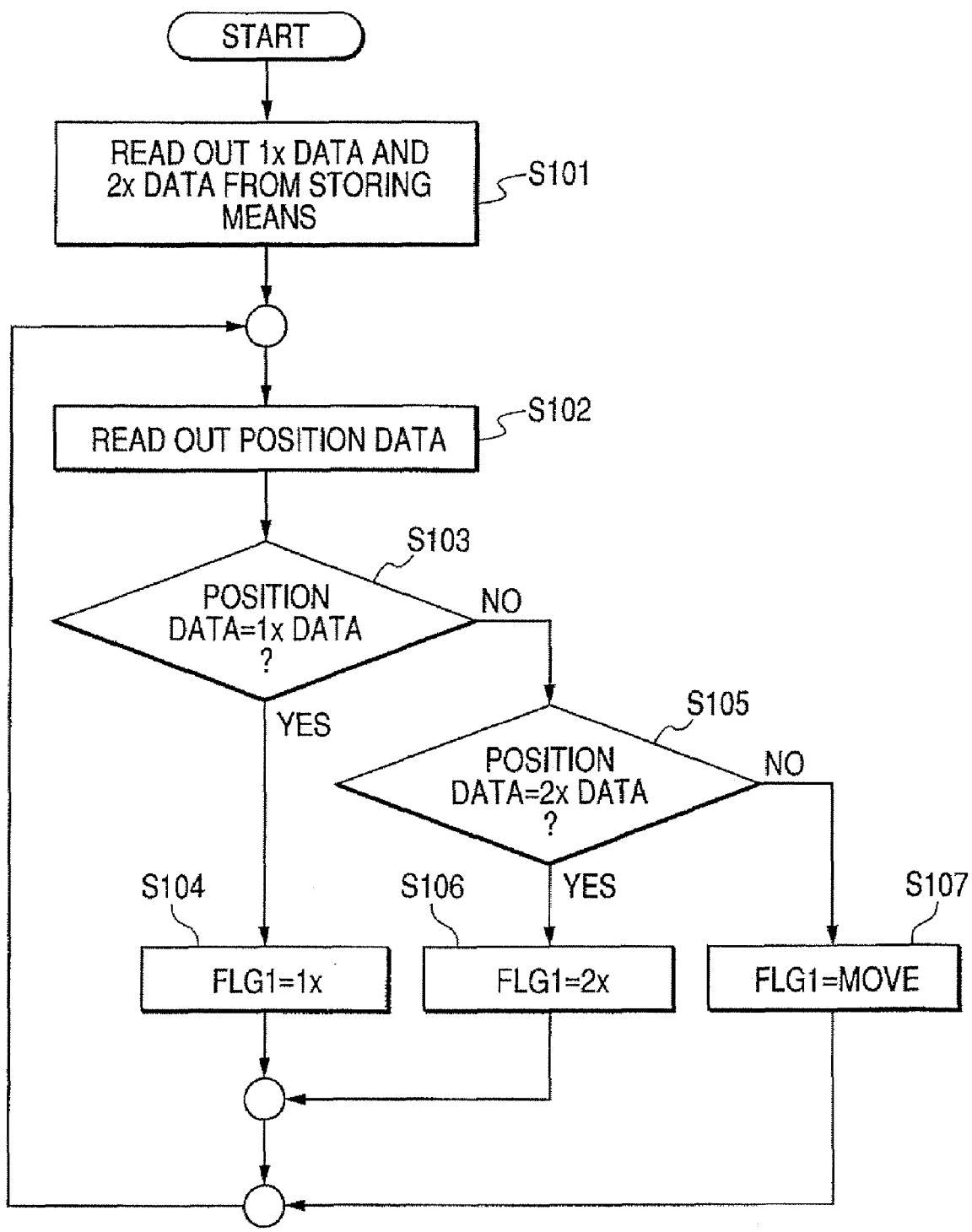
FIG. 3 is a flowchart of position detection of an extender optical system.

FIG. 3 is a flowchart of a position detection process of the extender optical system 9. On turning on power of an image pickup system, it reads out the relation between the magnification ratio of the extender optical system 9 and the position data stored in the nonvolatile memory 24 in a step S101. Next, it moves on to a step S102 to read out the position data on the extender optical system 9 from the extender optical system position detecting means 16. It moves on to a step S103 and compares the one-time data read in the step S101 with the position data read out in the step S103 to see whether they are equal. It moves on to a step S104 if equal, and moves on to a step S105 if not equal.

On moving on to the step S104, it sets a status flag FLG 1 of the extender optical system 9 at "1×" and returns to the step S102. In the step S105, it compares the two-time data read out in the step S101 with the position data read in the step S203. It moves on to a step S106 if they are equal, and moves on to a step S107 if not equal.

In the step S106, it sets the status flag FLG 1 of the extender optical system 9 at "2×". If it moves on to a step S107, it determines that the extender optical system 9 is being switched, and sets the status flag FLG 1 at "MOVE".

Figure 4:
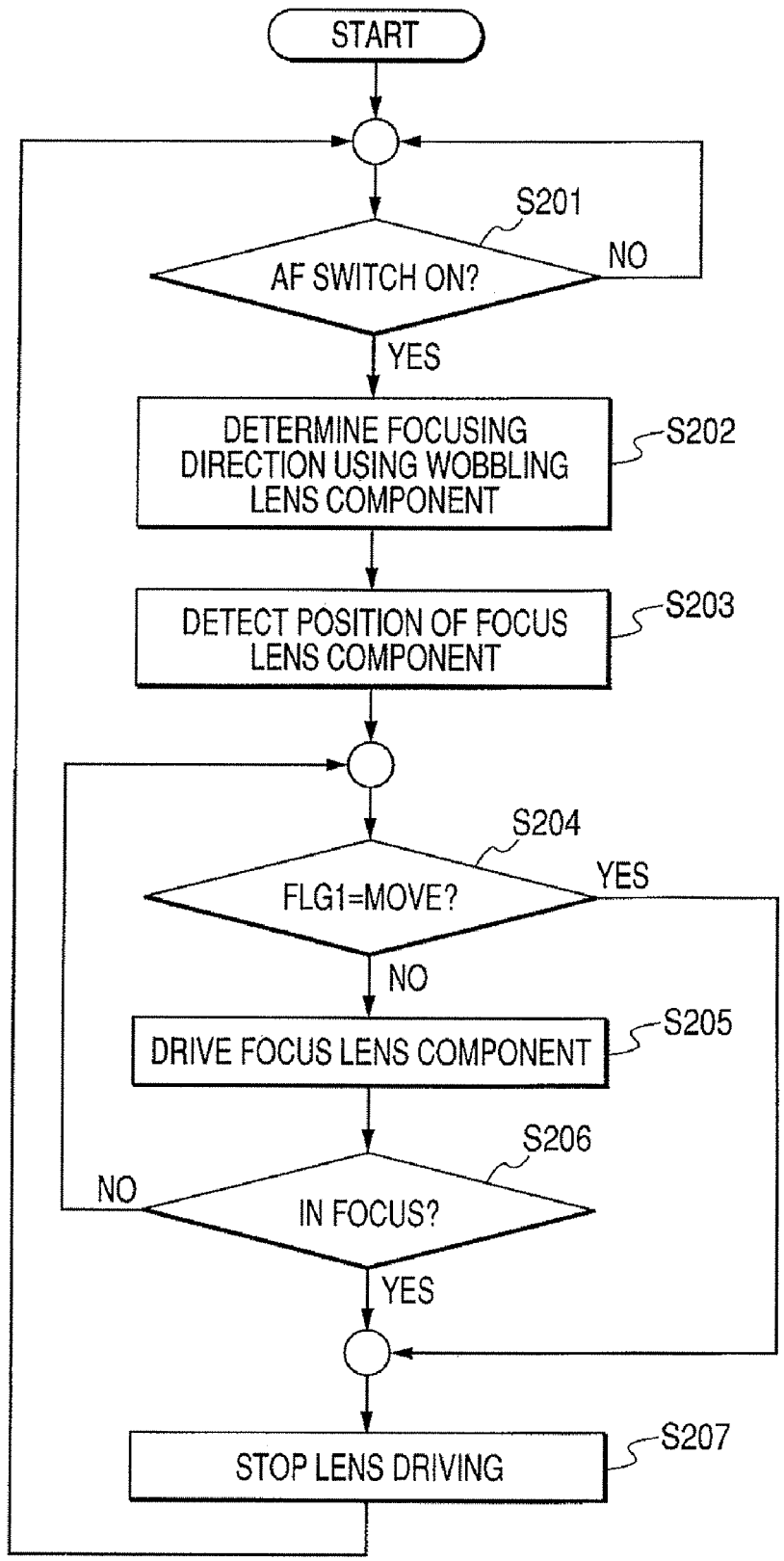
FIG. 4 is a flowchart of an AF operation of the first embodiment.

FIG. 4 is a flowchart of an AF operation of the first embodiment. On turning on the power of the image pickup system, it moves on to a step S201, and checks whether or not the AF switch 23 is in an on state. If the AF switch 23 is on, it is put in an AF operation state and moves on to a step S202. In the step S202, the lens control portion 13 drives the wobbling lens component 4 back and forth with the wobbling motor 7 in the optical axis direction to determine the direction in which the focusing position exists as against the current focus position of the focus lens component.

The direction in which the sharpness level increases is detected from the output of the AF circuit 12 to determine the focusing direction. It moves on to a step S203, and detects the current position of the focus lens component with the focus position detecting means 14.

Next, it moves on to a step S204 and checks the state of the extender optical system 9. In the case where the status flag FLG 1 is not "MOVE", it moves on to a step S205. In the case of "MOVE", it moves on to a step S207 and stops driving the lens.

In the step S205, it drives the focus lens component from the detected position of the focus lens component and a determination result of the focusing direction, and moves on to a step S206 to check whether or not focused based on the sharpness level.

In the case where it is not focused, it returns to the step S204 and continues to drive the focus lens component. In the case where it is focused, it moves on to a step S207 and stops driving the focus lens component.

To be more specific, it stops the AF operation and stops the focus lens component if determined that the extender optical system 9 is being switched. It restarts the AF operation if determined that the switching is completed.

Thus, it is possible to prevent a wasteful focusing operation during the switching of the extender optical system 9 and prevent increase in the time required for focusing as to the images after the switching of the extender optical system 9.

This embodiment shows an example in which the image pickup system is configured by the CCD 10 and the image processing circuit 11. However, the present invention also includes the image pickup system for receiving the video signals of the image pickup device or output signals of the image processing circuit from outside the image pickup system to exert focusing control.

To be more specific, the present invention includes a shooting system connected with a camera and a lens apparatus and a shooting system in which the image pickup device and the image processing circuit are built into the lens apparatus.

The present invention is also applicable to the lens apparatus replaceable to the camera for exerting the focusing control based on image pickup signals from the CCD placed in the camera and position information on the focus lens component and the extender optical system built in the lens apparatus.

Second Embodiment

Figure 5:
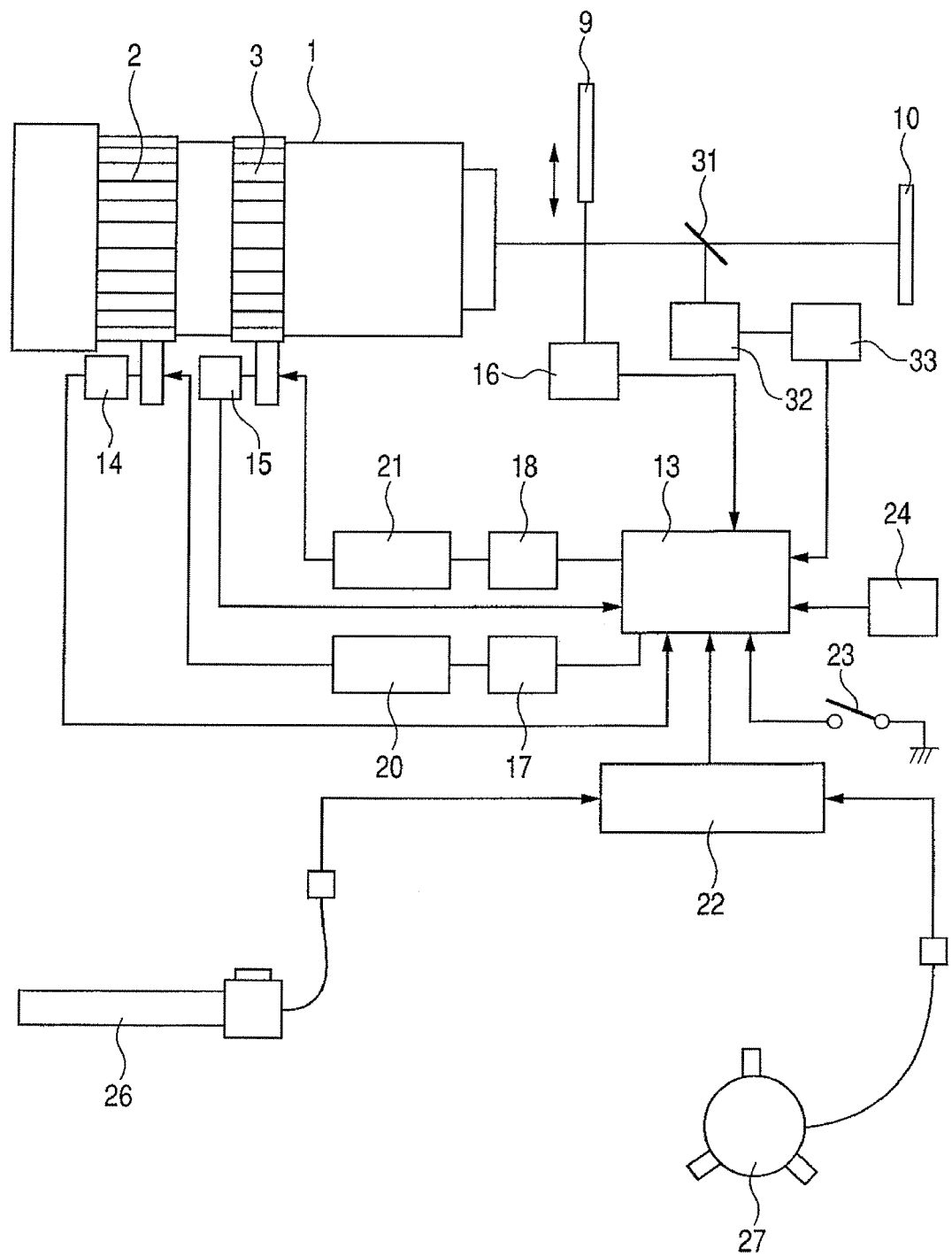
FIG. 5 is a block circuit configuration diagram of a second embodiment.

FIG. 5 is a block circuit configuration diagram of the image pickup system of a second embodiment, where the same symbols as those in the first embodiment indicate the same members. In the second embodiment, the wobbling lens component 4 of FIG. 1 is omitted, and a half mirror 31 is placed between the extender optical system 9 and the CCD 10. A focus detecting portion 32 is placed in a reflecting direction of the half mirror 31, and the output of the focus detecting portion 32 is connected to the lens control portion 13 via a focus detecting and calculating portion 33.

The focus detecting portion 32 is configured by an AF sensor consisting of multiple pairs of line sensor rows, and receives and accumulates the light of the subject via the half mirror 31. In the case where a focal point of the lens is located more anteriorly than the surface of the CCD 10, subject images formed on the pair of line sensor rows are close to each other. In the case where the focal point is located posteriorly, the subject images are apart. This relative position displacement amount of the subject images is in a specific functional relation with an out-of-focus amount of the AF lens. Therefore, the respective out-of-focus amounts, that is, defocus amounts can be detected by the outputs of the pairs of line sensor rows of the sensor.

The focus detecting and calculating portion 33 calculates the defocus amounts with image signal data accumulated by the focus detecting portion 32, and sends that information to the lens control portion 13.

The lens control portion 13 calculates a driving amount of the focus lens component required to take the focus according to the defocus amounts sent from the focus detecting and calculating portion 33, and outputs it to the focus motor driver 17.

Figure 6:
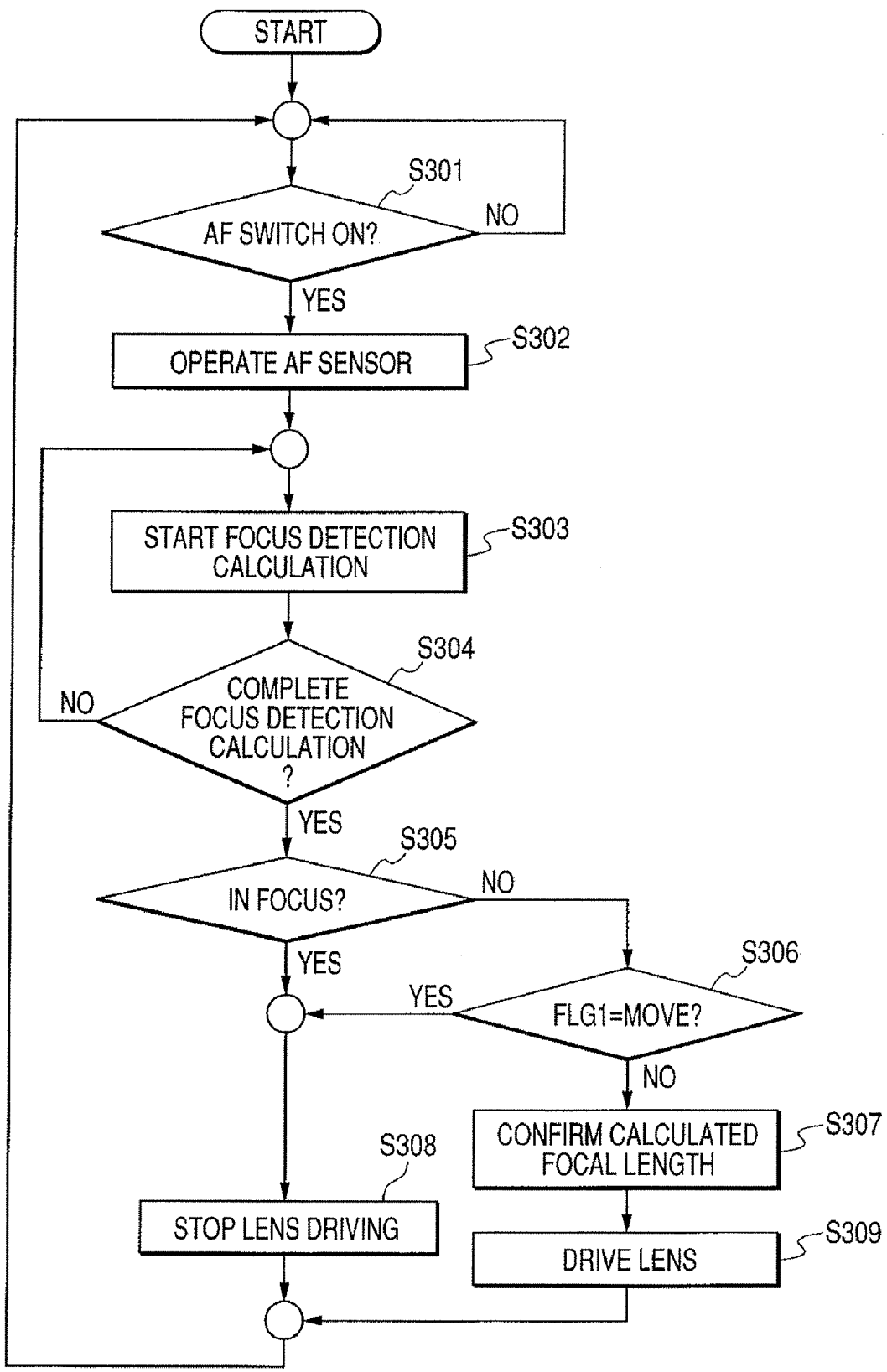
FIG. 6 is a flowchart of the AF operation of the second embodiment.

FIG. 6 is a flowchart of the AF operation of the second embodiment. On turning on the power of the image pickup system, it checks whether or not the AF switch 23 is in the on state in a step S301 first.

If the AF switch 23 is on, it is in the AF operation state. It moves on to a step S302, and the AF sensor in the focus detecting portion 32 is driven. The AF sensor accumulates the light received from the subject via the half mirror 31, and sends out the accumulated image signal data to the focus detecting and calculating portion 33 after completing the accumulation. It moves on to a step S303 and starts focus detection calculation.

And it moves on to a step S304, and returns to the step S303 if the focus detection calculation is not finished or moves on to a step S305 if finished. In the step S305, the current focus lens position is checked by the focus position detecting means 14 to see whether or not it is the same as the focusing position calculated from the defocus amount. In the case of the same position, it moves on to a step S308 and stops driving the lens. In the case of a different position, it moves on to a step S306 and checks the state of the extender optical system 9.

According to the second embodiment, the position detection process shown in FIG. 3 is performed as with the first embodiment so as to monitor position change of the extender optical system 9 constantly. In the case where the status flag FLG 1 of the extender optical system 9 is not "MOVE", it moves on to a step S307. In the case of "MOVE", it moves on to a step S308 and stops driving the lens.

In the step S307, it checks a distance to the subject from the focusing position calculated from the defocus amount. The lens control portion 13 generates the driving signal and sends it to the focus motor driver 17. In the step S309, the focus ring 2 is rotated by the focus motor 20 to the position of the focus lens component equivalent to that subject distance so as to move the focus lens component.

To be more specific, if determined that the extender optical system 9 is being switched, the AF operation is suspended and the focus lens component is stopped. If determined that the switching of the extender optical system 9 is completed, the AF operation is restarted. The AF method of the second embodiment also prevents the wasteful focusing operation during the switching of the extender optical system 9 so that the same effect as the first embodiment is obtained.

Third Embodiment

Figure 7:
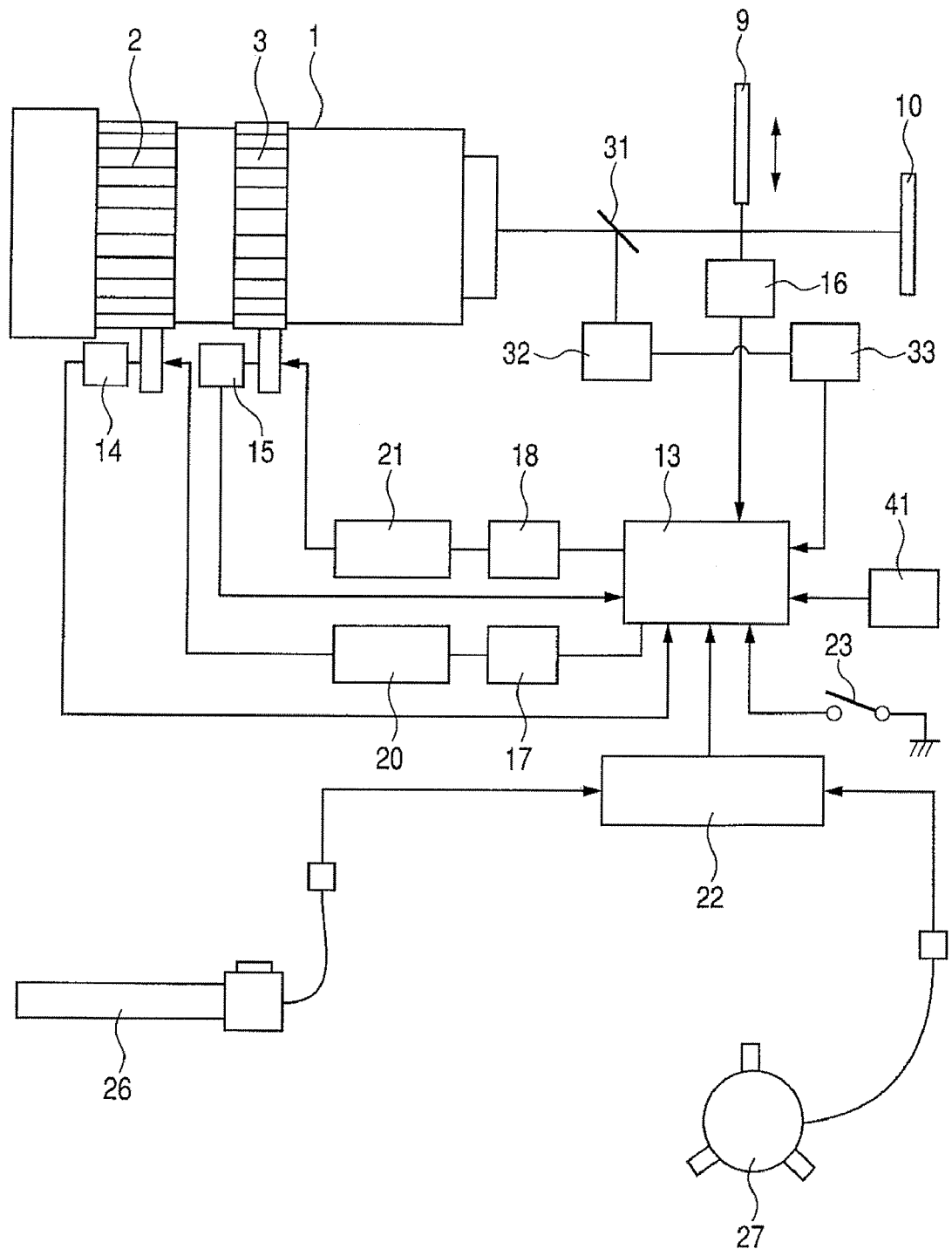
FIG. 7 is a block circuit configuration diagram of a third embodiment.

FIG. 7 is a block circuit configuration diagram of the image pickup system of a third embodiment. The second embodiment describes the configuration in which the extender optical system 9 is placed in the front part of the half mirror 31. According to the third embodiment, however, the extender optical system 9 is placed more posteriorly than the half mirror 31. The lens control portion 13 is connected with the output of a focus detection area setting switch 41.

In the case of attaching and detaching the extender optical system 9 to the optical path, an image magnification ratio of the focus detecting portion 32 does not change but only the image magnification ratio of the CCD 10 is enlarged or reduced. A principle of the AF operation of the third embodiment is the same as that of the second embodiment.

Figure 8:
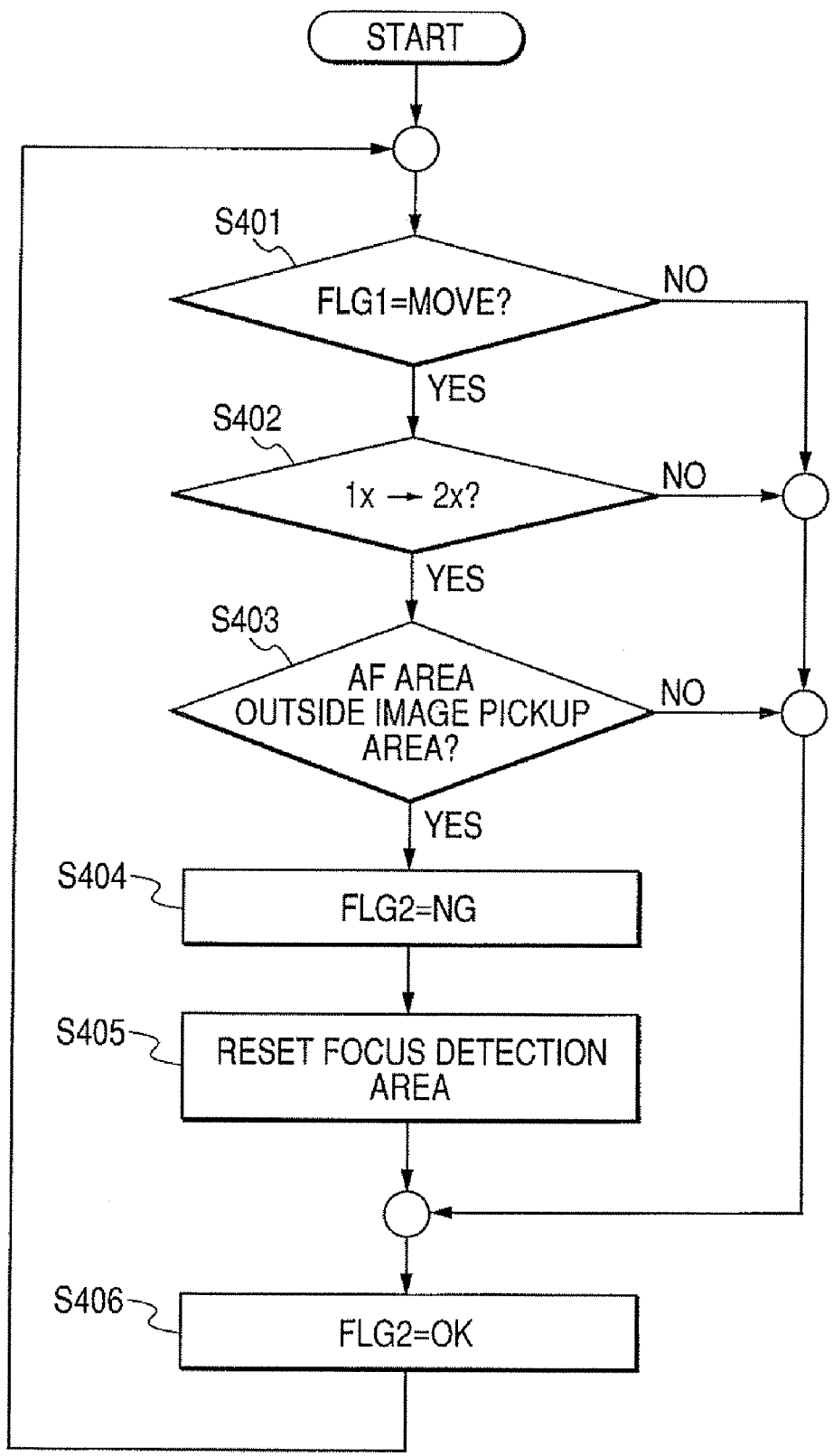
FIG. 8 is a flowchart of a focus detection area check.

FIG. 8 is a flowchart of the AF operation considering the switching of the extender optical system 9. It shows a process of checking whether or not the focus detection area set up on switching the extender optical system 9 is within the imaging range. The state of the extender optical system 9 is checked in a step S401.

In the third embodiment, the process in the flowchart of FIG. 3 is performed as with the first and second embodiments so as to monitor the position change of the extender optical system 9 constantly. In the case where the status flag FLG 1 of the extender optical system 9 is not "MOVE", it determines the status is stopping at a one-time or two-time position and moves on to a step S406 to set the AF control flag FLG 2 at "OK". In the case where the status flag FLG 1 is "MOVE", it moves on to a step S402 and checks whether a moving direction of the extender optical system 9 is one-time to two-time or two-time to one-time.

In the case where the moving direction of the extender optical system 9 is two-time to one-time, it moves on to the step S406 to set the AF control flag FLG 2 at "OK". In the case where the moving direction of the extender optical system 9 is one-time to two-time, it moves on to the step S403 and checks whether or not the focus detection area currently set up is within the imaging range after switching the extender optical system 9 to 2×.

For instance, in the case where the focus detection area is set up at the position of F1 in FIG. 10 by the focus detection area setting switch 41, the area is within the imaging range. In the case where the focus detection area is set up at the position of F2, however, it is not within the imaging range.

In the case where the focus detection area is within the imaging range after switching the extender optical system 9 to two-time, it moves on to the step S406. In the case where the area is not within the imaging range, it moves on to a step S404.

In the step S404, it sets an AF control flag FLG 2 at "NG" and then moves on to a step S405 to reset the focus detection area. For instance, it resets the focus detection area at the central position F1 of an image pickup screen in FIG. 10.

It is no problem to allow the user to set the position of the reset focus detection area arbitrarily in advance instead of the center of the screen. The size of the focus detection area may also be set arbitrarily by the user in advance. Next, it moves on to the step S406 to set the AF control flag FLG 2 at "OK".

Figure 9:
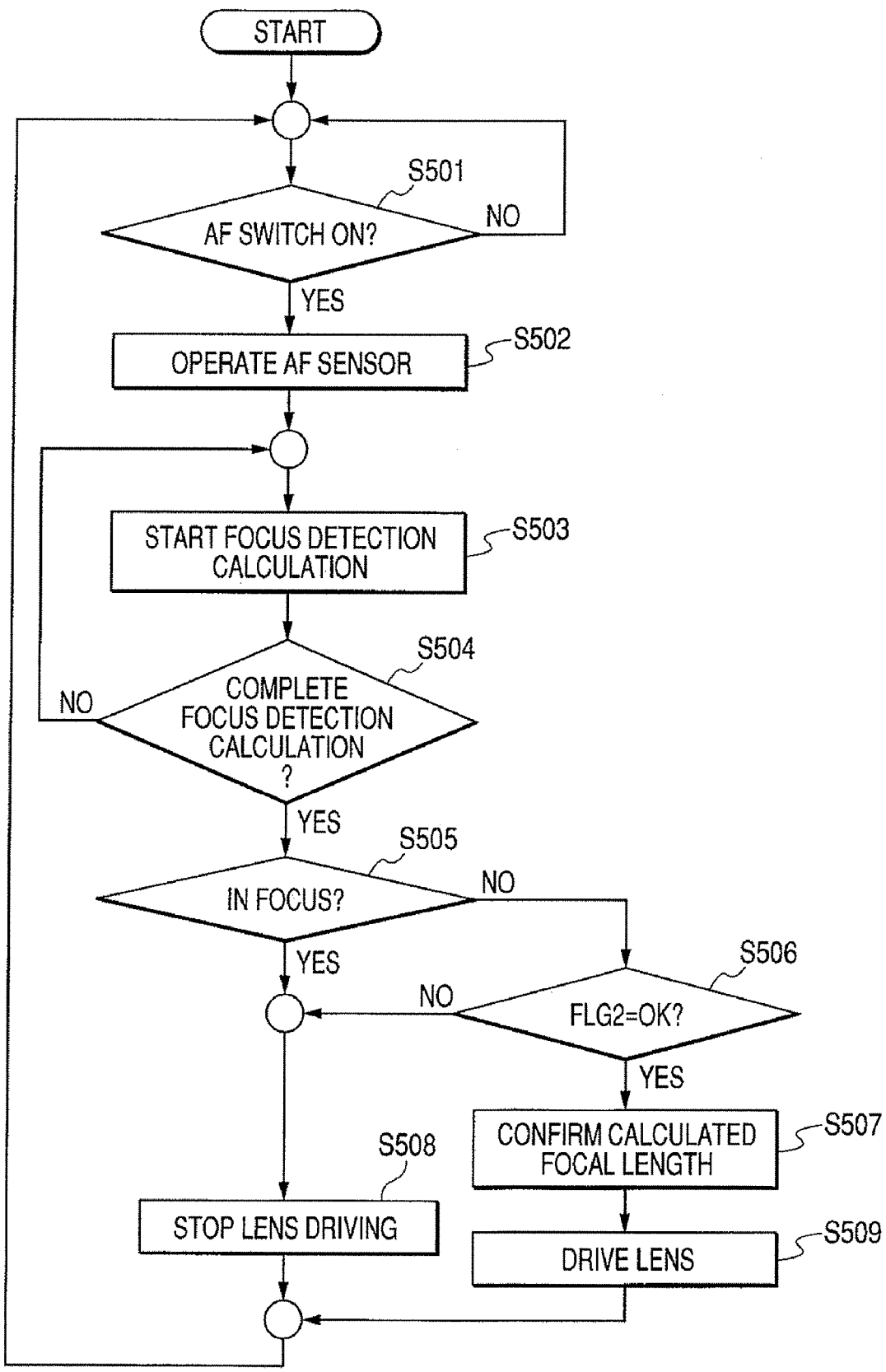
FIG. 9 is a flowchart of the AF operation of the third embodiment.

FIG. 9 is a flowchart of the AF operation of the third embodiment. On turning on the power of the image pickup system, it moves on to a step S501 first, and checks whether or not the AF switch 23 is in the on state. If the AF switch 23 is on, it is put in the AF operation state and moves on to a step S502. In the step S502, the AF sensor in the focus detecting portion 32 is driven.

Next, it moves on to a step S503 to start the focus detection calculation, and moves on to a step S504 to determine whether or not the focus detection calculation is finished. If not finished, it returns to the step S503. If finished, it detects the current focus lens position with the focus position detecting means 14 in a step S505 to see whether or not it is the same as the focusing position calculated from the defocus amount.

In the case of the same position, it moves on to a step S508 and stops driving the lens. In the case of a different position, it moves on to a step S506 and checks the state of the AF control flag FLG 2.

In the case where the AF control flag FLG 2 is "OK", it moves on to a step S507. In the case of "NG", it moves on to the step S508. In the step S507, it checks the distance to the subject from the focusing position calculated from the defocus amount.

The lens control portion 13 generates the driving signal and sends it to the focus motor driver 17. In the step S509, the focus ring 2 is rotated by the focus motor 20 to the position of the focus lens component equivalent to that subject distance so as to move the focus lens component.

According to the third embodiment, the optical path to the focus detecting means is not intercepted by switching the extender optical system 9. Therefore, even when the extender optical system 9 is in operation, the AF operation may be restarted if the resetting of the focus detection area is completed.

As described above, AF processing is switched on and off by determining whether or not the focus detection area is within the imaging range after switching the extender optical system 9. And it is possible, by resetting the focus detection area, to prevent the image within the imaging range from becoming out-of-focus.

The AF method of the third embodiment is a phase difference detection method. However, the AF method is not limited thereto. For instance, the contrast AF method for exerting focusing control based on the sharpness level of the image as in the first embodiment is also applicable.

As many apparently widely different embodiments of the present invention can be made without departing from the sprit and scope thereof, it is to be understood that the invention is not limited to the specific embodiment thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priorities from Japanese Patent Application No. 2005-266059 filed on Sep. 13, 2005, the contents of which are incorporated hereinto by reference.

What is claimed is:

1. An optical instrument including an automatic focus adjustment device, comprising:
    an image taking optical system, including a focus lens unit and a magnification unit, configured to form a subject image;
    a focal length switching unit for changing a focal length of the image taking optical system in accordance with a magnification level established by said magnification unit;
    a position detecting unit for detecting a position of the focal length switching unit;
    a focus detecting unit for detecting a focusing position of the subject image;
    a focus detection area setting unit for setting a focus detection area in response to detection of said focusing position by the focus detecting unit; and
    a control unit for controlling a position of the focus lens unit based on a detection result of the focus detecting unit, wherein:
    the control unit prevents movement of the focus lens unit when the position detecting unit detects that the focal length switching unit is being changed from a predetermined magnification level to another magnification level, and
    when the focus detection area gets out of a predetermined imaging range, the focus detection area is adjusted in accordance with the position of the focal length switching unit such that the subject image constantly maintains the focusing position.

2. The optical instrument according to claim 1, wherein the control unit prevents driving of the focus lens unit in the case where the position of the focal length switching unit detected by the position detecting unit is changed.

3. The optical instrument according to claim 1,
    wherein the control unit controls the position of a focus based on an image pickup signal within the focus detection area.

4. The optical instrument according to claim 1, wherein the control unit changes the focus detection area based on position information of the focal length switching unit obtained by the position detecting unit.

5. The optical instrument according to claim 1, wherein driving of the focus lens unit is prohibited when position information on the focal length switching unit obtained by the position detecting unit being changed from a predetermined position.

6. The optical instrument according to claim 1, wherein driving of the focus lens unit is prohibited in the case where position information obtained by the position detecting unit is changed.

7. The optical instrument according to claim 1, wherein the focus detection unit detects the focusing position by receiving light from a half mirror disposed at a position between the image taking optical system and the focal length switching unit.

* * * * *